United States Patent [19]

Delpierre, III et al.

[11] Patent Number: 5,413,805
[45] Date of Patent: May 9, 1995

[54] LOW OR NO FAT GRANOLA CEREAL MIX AND PROCESS

[75] Inventors: Phillip Delpierre, III, Kalamazoo; Pamela J. Stanyon, Battle Creek; Charles R. Eldred, Bellevue, all of Mich.

[73] Assignee: Kraft Foods, Inc., Northfield, Ill.

[21] Appl. No.: 938,186

[22] Filed: Aug. 31, 1992

[51] Int. Cl.⁶ ............................................. A23L 1/18
[52] U.S. Cl. ........................................ 426/620; 426/94; 426/289; 426/302; 426/621
[58] Field of Search .................. 426/94, 30, 289, 302, 426/620, 621

[56] References Cited

U.S. PATENT DOCUMENTS

| | | | |
|---|---|---|---|
| 3,582,336 | 6/1971 | Rasmusson | 99/83 |
| 3,840,685 | 10/1974 | Lyall et al. | 426/201 |
| 3,868,471 | 2/1975 | Decelles et al. | 426/303 |
| 3,876,811 | 4/1975 | Bonner et al. | 426/93 |
| 3,903,308 | 9/1975 | Ode | 426/93 |
| 4,038,427 | 7/1977 | Martin | 426/285 |
| 4,061,790 | 12/1977 | Cole, Jr. | 426/303 |
| 4,451,488 | 5/1984 | Cook et al. | 426/89 |
| 4,497,840 | 2/1985 | Gould et al. | 426/560 |
| 4,605,561 | 8/1986 | Lang | 426/93 |
| 4,871,557 | 10/1989 | Linscott | 426/93 |
| 4,913,919 | 4/1990 | Cornwell et al. | 426/94 |

Primary Examiner—Donald E. Czaja
Assistant Examiner—Mary S. Mims
Attorney, Agent, or Firm—Thomas A. Marcoux; Thomas R. Savoie

[57] ABSTRACT

Ready-to-eat, low or no fat granola cereal is prepared from a 60% to 85% cereal base by coating the cereal base with 10% to 30% sugars and drying. The granola cereal product contains little or no added fat and from 30% to 50% cereal flakes, 10% to 40% other cereal ingredients including 5% to 20% crisp rice, 5% to 20% rolled grains and up to 20% cereal flour. Optionally from 1% to 5% maltodextrin is added to tackify the product.

9 Claims, No Drawings

LOW OR NO FAT GRANOLA CEREAL MIX AND PROCESS

TECHNICAL FIELD

This invention relates to ready-to-eat low or no fat added granola cereal and the process for preparing same.

BACKGROUND ART

Granola cereals are typically high in fat due to the addition of 10% or more oil, which is an important attribute of such cereals causing the cereal to cluster and have a pleasing appearance and texture.

Granola cereals and food bars have been known and available for some time. Granola's generally contain a grain or grains, nuts, possibly dried fruit, sweeteners and other ingredients. The ingredients can be mixed with a binder such as a sugar syrup and/or fat or shortening and agglomerated or compressed into bars or slabs which may be later cut to a desired size. Depending on the granola's composition, it may be mixed, formed and/or baked prior to packaging and sale.

Martin, U.S. Pat. No. 4,038,427, teaches a natural granola product known as C. W. Post brand granola cereal. An assortment of amylaceous and proteinaceous particles are aggregated around puffed, cupped, toasted cereal (such as crisp rice as it is referred to in the trade) which serve as focal points for the particles. The aggregates are preserved and agglomerated in a fat and sugar syrup coating.

A large number of people are desirous of having a granola product which is natural and yet contains low fat or no added fat while retaining the distinctive clustered appearance and the taste and crispy texture of such cereals or food bars.

DISCLOSURE OF THE INVENTION

Ready-to eat, low or no fat added granola cereals are prepared from a major amount of cereal base agglomerated and formed into clusters using a coating syrup. The cereal base contains a major amount of cereal flakes with the remainder rolled cereal, cereal flour and crisp rice.

Maltodextrin may be used to improve tackiness of the cereal mixture providing for better clusters typical of high fat products.

The product is prepared by mixing the cereal base and other granola type materials such as dried fruit and edible nuts and coating the mixture with a coating syrup followed by liquid sucrose. Fat, where added, is sprayed on the mix prior to the coating syrup. The mixture is baked or heated in a oven or drier to cook, brown and dry the product into a dry sheet of granola cereal which may be gently broken into bars or clusters and packaged.

BEST MODE FOR CARRYING OUT THE INVENTION

According to this invention, a cereal mixture is disclosed that meets the shortcomings of the prior art in providing a no or low fat added granola cereal with clusters similar to granola cereals prepared with high levels of added fat.

The granola cereal comprises 60% to 85% cereal base and 10% to 30% added sugar (not contained within the cereal-based ingredients). The cereal base portion contains a major amount of cereal flakes with the remainder being other cereal solids such as rolled grains, grain flours and crisp rice. The base also, preferably, contains a small amount of maltodextrin.

The base is agglomerated using a low amount of fat, if desired, but preferably no fat followed by a coating syrup and finally a liquid sucrose. The mix is heated in an appropriate oven or drier to cook, brown and dry the product which is then gently broken into clusters. Granola bars or other forms may be prepared in a similar fashion.

In a preferred embodiment, maltodextrin is used to increase the tackiness of the mixture which helps give appropriately sized granola clusters.

In a further preferred embodiment, a major amount of the cereal base is cereal flakes where a major amount of the flakes after passing through a ¼ inch screen are retained on a 12 mesh screen while the remainder of the flakes pass the 12 mesh screen.

The cereal flakes can be prepared from grain flakes such as wheat, corn, barley and oats with or without added bran or the like. We prefer to employ wheat, corn, barley or oat flakes which are ground to a particle size such that from 0 to 10% are retained on a ¼ inch screen, of the remainder from 50% to 90% pass through a ¼ inch screen and rest on #12, preferably from 60% to 80%, and 10% to 50% pass through a #12 and rest on the pan, preferably 20% to 40%. This particle size is preferred since it appears to agglomerate best with the other granola ingredients and form good size clusters after coating with sugar, drying and gentle breakage on a sizing screen. The preferred particle size is about 5% retained on a ¼ inch screen, about 70% through a ¼ inch screen and rest on #12 screen and about 25% through the #12 screen and rest on the pan.

The amount of cereal flakes based on the entire product varies from about 30% to about 50% with 35% to 45% preferred. The amount of other cereal ingredients other than cereal flakes comprise from about 10–40%, preferably 15 to 35% based upon the finished food product.

The non-flaked cereal portion of the food is prepared from rolled grains such as 5% to 20% rolled oats, wheat, barley and the like, preferably 5% to 15%, from 0% to 20% cereal flour such as wheat, rice, oat, corn or the like, preferably 5% to 15% and from 5% to 20% crisp rice, preferably 5% to 15% crisp rice, all percentages based upon the final granola cereal product.

The admixture of cereal grain components can include rolled oat groats, bumped rolled wheat or bumped rolled barley. The level of oats, wheat and barley used will be dictated by nutritional requirements as well as palatability and other organoleptic considerations. Other cereal grains, such as cereal flour, may be employed in lieu of or in addition to oats, wheat and barley for ration balancing while still practicing the distinct aggregating advantages accruing from use of flaked cereal grains.

The agglomerate may also contain a number of alternative ration-balancing cereal protein or protein sources in the above preferred ration; e.g., soy bean curd, wheat germ, rye, corn, milo, sorghum, buckwheat meals and/or flours and mixtures of these ingredients, the range of such ratio balancing cereal proteins being between 0 and 10 percent of the total ration. Usually these cereal grains or protein sources as in the case of wheat germ or high protein classified wheat flours fractions recovered by sieving or air classification will be selected in accordance with intended nutritional benefits and organoleptic values that are compatible therewith.

Bumped oat, wheat, barley or equivalents are obtained by soaking in cold or warm water to soften the grain; steaming or partial cooking by other means; and subsequent tempering of the cereal grains; whereupon they are flattened and thus opened in structure so that they are more digestible and more readily rehydratable. The act of bumping produces a flattened shape which permits the aggregate to nest or bridge by virtue of the exposed dextrinous character of the surfaces thereof as they undergo tumbling in intimate association with the cereal flakes and crisp rice. Bumping coupled with soaking as in the case of grains such as oats renders the cereal grain more tender or pliable when consumed either dry or wetted and more organoleptically acceptable.

The use of crisp rice provides excellent texture and agglomeration properties. The process used to produce the crisp rice is not a critical aspect of the invention. Typically, parboiled, milled white rice will be pressure cooked with a flavoring syrup whereupon the rice will be dried to a moisture content, say, in the order of 15% to 20% and then tempered for a prolonged period (e.g., 16 hours), whence it will be charged to a pre-heated oven to plasticize and warm the rice to a relatively high temperature to condition the rice for bumping. The rice will be bumped, but not flaked, to the point of producing a flattened, non-resilient rice mass; the rice will be flattened to less than that condition wherein it loses its integrity as a grain per se; the bumped rice will thus assume a thickness dimension generally 50% to 75% of the cooked tempered rice dimension just prior to bumping. After bumping, the rice will be charged to a puffing oven where it will be blasted with heated air (450° F. to 500° F.) at atmospheric conditions for a period of, say, 12 to 15 seconds to produce the characteristic puffed crisp rice.

The cereal flakes and other cereal ingredients are supplemented with conventionally employed dry fruits and edible nuts and milk derivatives. For example, dried fruit such as coconut, raisins and apricots may be employed. Edible nuts such as almonds, walnuts and other consumer preferred nuts may be used. Milk derivatives such as non fat milk, whole dried milk, sweet whey and the like can be employed.

The clusters of cereal are prepared by mixing the cereal flakes and other cereal components and optionally the maltodextrin with a coating syrup and optionally a small amount of oil which together render the cereal tacky and effect agglomeration on mixing. Sucrose syrup is then added. The coating syrup, sucrose syrup and cereal mixture may be mixed in a bowl or tumbled in rotating drums or in screw conveyors. Once the cereal is coated with syrup, the mixture is placed on trays or belts or other solid, perforated or screen surfaces and baked in an oven or hot air dried to evaporate water, cook and brown the cereal and adhere the cereal particles to each other.

We employ from 10% to 30% coating and sugar syrup, preferably from 10% to 25% based on the total final product weight.

The majority of the sugar employed, at least 70%, preferably 80% or more is sucrose with the balance made up of honey, molasses, corn syrup, both high fructose and conventional and other sweet ingredients. The sugars may be applied as a single syrup or the corn syrup, molasses and other non-sucrose sweeteners may first be applied as by spray in a coating drum followed by sucrose syrup.

In this connection, the employment of 1% to 15%, preferably 1% to 5%, by weight of final cereal of amorphous monosaccharides, predominantly corn syrup made up of a majority of glucose or honey made up of a majority of fructose, is instrumental in achieving a semi-glossy, non-crystallizing coating which provides a substantially continuous barrier to oxidation.

In effecting agglomeration, syrup must be sprayed or poured into a mixing vessel containing the dry cereal ingredients. Suitable equipment for achieving agglomeration includes a batch system such as a coating reel, ribbon blender or a continuous system such as a single or multiple mixing auger. When utilizing a coating reel the pre-mixing of the dry blend ingredients to be agglomerated, the rate of rotation of the reel, the diameter thereof and the number of flights or baffles employed to promote a tumbling action are matters within the skill of art workers and form no part of the present invention. However, it is preferred in effecting a tumbling action to avoid excessive heating of the coating reel. Such low temperature processing promotes a good syrup distribution without premature moisture loss; a preferred embodiment is that the coating operation proceed at an ambient agglomerating temperature in the zone of aggregation below 120° F.; the syrup will be at a more elevated temperature—say, about 120° F. to 150° F.—whereat it will be fluid and evenly distributable and possess requisite stickiness.

The tacky nature of the syrup, when warm, should promote sufficient initial aggregation to assure that clustering of particles occurs around the cereal flake and the crisp rice. Generally speaking, it will be a preferred embodiment of the invention that maltodextrin be added to the dry cereal ingredients which improves agglomeration of cereal flakes, flour, crisp rice, fruit and nut solids.

A major amount of sucrose solution is added after the initial coating of monosaccharide which on evaporation of the water forms a hard coating which adds strength and oxidative protection to the agglomerated cereal matrix and resists stickiness at high humidity and temperature during storage.

Should a low fat variety of product be desired, up to 10% fat, preferably about 5% to 9% fat can be added by spray prior to any sugar coating. Substantially less fat is used in this embodiment than prior art granolas. If desired, fat and sugar may be applied in a single step although we prefer to employ multiple coating steps. When no fat is added to the cereal, the fat content of the total cereal is usually less than 2%.

The sugar syrup will be applied at around 70° Brix and will be fluid enough to be delivered by suitable spray or other coating application equipment known in the arts; generally the degrees Brix is below 75 in order to assure good distribution of syrup providing a complete continuous coating over the particles in the final agglomerate. Commonly, the syrup will be elevated to a temperature where all of the solids are in solution and the syrup may thereafter be applied after the particles are oil coated.

Fat and sugar may be applied by alternative coating means or simultaneously as an emulsion wherein the sugar is dissolved in water and the fat is emulsified therewith. Methods whereby the cereal components are aggregated and thereafter agglomerated will be varied depending upon ultimate intended texture. Thus, in one, the cereal particles may be co-mixed with a dry powderous saccharide mixture and the dextrinized cereal and wetted by a water spray, water addition to the mix or admission to a humid atmosphere. The saccharides, exposed to moisture, will be partially or totally dissolved and cause the cereal mixture particles to agglomerate on mixing or tumbling.

Another alternative may be the "creaming" of the aforesaid powderous saccharides with or without oil in a plastic state to produce a sugar-cream type of homogeneous mixture. This material will desirably have only minimal amount of water added to it and will be whipped or otherwise mixed to produce a moderate degree of overrun; having produced this low density matrix-forming saccharide mixture, the cereal mixture ingredients will be folded in uniformly to produce an agglomerate. The agglomerates mix can be ultimately subjected to a dehydration or baking operation with an optional forming operation, typically a 1 inch bed being compacted to, say, a ¾ inch bed and subdivided or broken after drying for sizing to the desired agglomerate or cut into granola bars.

In the preferred embodiment, part of the basis for agglomeration of the cereal components is the use of from 1% to 5%, preferably 1% to 3% of a maltodextrin which is added dry with the cereal ingredients prior to sugar addition. On wetting, the maltodextrin causes the cereal surfaces to be tackler than would be the case without the dry maltodextrin. The maltodextrin can be a derived from a cereal grain or a tuber (i.e., tapioca, potato, etc.) wherein the starch is converted to maltodextrin with a DE of from 3 to 20 such as Rice*Trin brand rice maltodextrin available from Zumbro, Inc., Hayfield, Minn., 55940.

The invention is further described but not limited by the following examples.

EXAMPLE 1

A no fat-added granola is prepared as follows. The following dry fraction ingredients are weighed and added to a coating reel (multiflighted). For the purpose of this Example, a coating reel is utilized.

|  | % |
| --- | --- |
| Ground Cereal Flakes | 59.5 |
| Quick Cooking Rolled Oats | 15.1 |
| Crisp Rice | 20.8 |
| Maltodextrin | 3.2 |
| Sweet Whey | 1.4 |

The dry fraction ingredients are mixed in a coating reel operating at 30–60 RPM for 5 minutes. Optionally almonds or coconut could be added to the dried ingredients above. Where oil addition is desired, oil is poured or sprayed onto the preblended dry ingredients in the mixing vessel and mixed for an additional 5 minutes at the same speed to insure distribution of the oil on the surfaces of the ingredients and impregnation thereof. This particular example did not incorporate oil addition.

Separately, a coating syrup is prepared having the following ingredients.

|  | % |
| --- | --- |
| Molasses | 7.0 |
| Corn Syrup - 42 DE | 9.0 |
| Honey | 26.0 |

|  | % |
| --- | --- |
| Water | 58.0 |

The foregoing coating ingredients are dissolved at 170° F. to produce a syrup solution which is poured or sprayed at 170° F. onto the dry ingredients (optionally oil coated) fraction, in the rotating reel, and mixed for an additional 5 minutes of tumbling so as to promote uniform coating of the material and particle aggregation.

Liquid sucrose at 67% solids is then poured or sprayed on the cereal mix, and agitated to thoroughly coat the cereal mass.

Blend percentages of the following fractions is as follows:

|  | % |
| --- | --- |
| Dry Ingredient Fraction | 66.0 |
| Coating Syrup | 8.0 |
| Liquid Sucrose | 26.0 |

The coated aggregates are then removed from the coating reel and loaded into tray-type dryer screens at a moisture content of approximately 15% and a bed depth of at least ½ inch and usually ¾ inch to 1 inch or more. The material is leveled prior to drying with a spatula to induce slight compression and consequent compaction. The loaded screens are then subjected to an air circulation dryer wherein the material is dried using an air temperature of at least 180° F., preferably 240°–250° F. for 15 minutes, with a maximum updraft air flow to produce a dried sheet of cereal having a moisture content under 5%. The dry cereal sheet is broken apart while still in a warm plastic state, cooled and sized by passing through a wire screen having ¾ inch openings. The sized, cooled agglomerate is then collected for packaging. The dried agglomerates have a final moisture of 1–3.0%.

EXAMPLES 2 & 3

Two granola cereals were prepared designed to provide 3 grams of fat and 3 grams of fiber (3,3 formula) and 0 grams of fat and 3 grams of fiber (0,3 formula) for each 28.35 gram serving of cereal.

| Ingredient | 3.3 formula % as is | 0.3 formula % as is |
| --- | --- | --- |
| Wheat Bran Flake | 37.5 | 38.9 |
| Rolled oats | 4.8 | — |
| Crisp Rice | 5.7 | 13.6 |
| A dry blend of other cereal ingredients | 17.0 | 12.8 |
| Rolled oats | Rolled oats | |
| Oat Flour | Rice*Trin 10 | |
| Rice*Trin 10 | Sweet Whey | |
| Sweet Whey | | |
| Sunflower oil | 7.6 | no oil added |
| Coating Syrup I | 8.4 | 8.5 |
| Water | | |
| Honey | | |
| 2 DE Corn Syrup | | |
| Molasses | | |
| Sugar Syrup II | 19.0 | 19.0 |
| Liquid Sucrose | | |
| TOTAL | 100.0 | 100.0 |

The bran flakes are sized in a rotary mill at a rate of 1220 lbs./hr. Average screen fraction was:

|  | % |
|---|---|
| On ¼" | 5.4 |
| On #12 screen | 70.0 |
| On pan | 24.6 |

The flakes were conveyed to a feed bin which caused further breakage and gave a final screen fraction of:

|  | % |
|---|---|
| On ¼" | 1.7 |
| On #12 screen | 59.3 |
| On pan | 39.0 |

Rolled oats and crisp rice were prepared as is known in the art and described herein. The dry ingredients were combined as well as mixed. Sunflower oil was applied in formula 3,3 in a mixing conveyor. The coating syrup was mixed and heated to 170° F. The mixture at 38% solids and about 150° F. to 170° F. was sprayed onto the cereal as it is mixed. The sucrose syrup (70% solids) was heated to 170° F. and sprayed on the cereal mix as it was being mixed.

The brix of the liquid ingredients was as follows:

|  | Bx |
|---|---|
| Sucrose | 67.5 |
| Honey | 81.8 |
| 42 DE Corn syrup | 83.5 |
| Molasses | 79.2 |

The mixture was conveyed to a Proctor and Swartz Drier operating under the following conditions.

|  | 3,3 formula | 0,3 formula |
|---|---|---|
| Belt speed (volts) | 32–35 | 40 |
| Bed depth (inches) | 1.5–1.75 | 1.75–2.0 |
| Air temperature (°F.) |  |  |
| Zone #1 | 205 | 215 |
| Zone #2 | 210 | 220 |
| Zone #3 | 210 | 220 |

The dried product, in sheets, exiting the drier was forced through a ¾ inch top table screen, cooled and then packaged.

A screen fraction of the product after cooling is:

|  | Weight % After Cooling | |
|---|---|---|
| Screen | 3,3 | 0,3 |
| On ½" | 6.9 | 6.3 |
| On ¼" | 42.2 | 37.5 |
| On #6 | 36.7 | 37.4 |
| On pan | 14.2 | 18.2 |
| Moisture - % | 3.1 | 2.8 |

The final product characteristics (%) are as follows:

|  | 3 Fat, 3 Fiber Product | 0 Fat, 3 Fiber Product |
|---|---|---|
| Wheat Bran Flakes | 41.2 | 43.8 |
| Rolled Oats | 10.4 | 11.1 |
| Oat Flour | 10.0 | — |
| Maltodextrin (Rice*Trin 10) | 2.3 | 2.3 |
| Crisp Rice | 6.2 | 15.3 |
| Sweet Whey | 1.0 | 1.0 |
| Sugar | 14.0 | 19.8 |
| Honey | 2.0 | 2.0 |
| Corn Syrup | .7 | .7 |
| Molasses | .5 | .5 |
| Sunflower oil | 8.3 | none |
| Water | 3.5 | 3.5 |
|  | 100.00 | 100.00 |

EXAMPLE 4

In a similar fashion as described in Examples 2 and 3, a granola cereal was prepared which provided 2 grams of fat and 3 grams of fiber for each 28.35 gram serving of cereal. The identical process was utilized to produce this granola cereal. The compositional makeup of the blend of ingredients and the finished final food product is given in the table below.

|  | Blend % | Finished Food % |
|---|---|---|
| Wheat Bran Flakes | 38.2 | 41.9 |
| Crisp Rice | 5.8 | 6.4 |
| Oat Flour | 9.5 | 10.4 |
| Rolled Grains (Combination of oats and barley) | 9.8 | 10.6 |
| Sweet Whey | 1.0 | 1.1 |
| Maltodextrin (Rice*Trin 10) | 1.9 | 2.1 |
| Sunflower oil | 5.8 | 6.4 |
| Honey | 2.3 | 2.1 |
| Corn Syrup 42 DE | .8 | .7 |
| Molasses | .6 | .5 |
| Water | 4.9 | 3.5 |
| Liquid Sugar | 19.4 | 14.3 |
|  | 100.0 | 100.0 |

We claim:

1. A granola cereal containing up to 10% fat prepared from a major amount of cereal base which is agglomerated and formed into clusters with a coating syrup which comprises 60% to 85% cereal base and 10% to 30% added sugar, said cereal base comprising from 30% to 50% cereal flakes based upon the weight of the granola cereal product, 5% to 20% rolled grains selected from the group consisting of rolled oats, wheat, barley and combinations thereof, from 0 to 20% cereal flour and from 5% to 20% crisp rice, and from about 1% to about 5% maltodextrin to improve the tackiness of the cereal mixture, said cereal flakes having a particle size wherein a major amount of the flakes after passing through a ¼ inch screen are retained on a #12 mesh screen while the remainder of the flakes pass the #12 mesh screen, said particle size further improving agglomeration of the clusters, and said 10% to 30% added sugar being present as a coating for the agglomerated clusters of cereal.

2. The product of claim 1 wherein the maltodextrin has a DE of from 3 to 20 and wherein the maltodextrin is derived from a cereal grain or tuber.

3. The product of claim 1 wherein the cereal flakes are ground to a particle size such that from 0 to about 10% are retained on a ¼ inch screen, of the remainder of the cereal flakes from about 50% to about 90% pass through a ¼ inch screen and rest on a #12 sieve screen and about 10% to about 50% pass through a #12 sieve screen and rest on the pan.

4. The product of claim 1 wherein the cereal flakes are ground to a particle size such that from about 60% to about 80% pass through a ¼ inch screen and rest on a #12 sieve screen and about 20% to about 40% pass through a #12 sieve screen and rest on the pan.

5. The product of claim 1 wherein the cereal base comprises from 35% to 45% cereal flakes, from 5% to 15% rolled grains and from 5% to 15% crisp rice.

6. The product of claim 1 wherein the cereal base contains from 5% to 15% cereal flour.

7. The product of claim 1 wherein the sugar coating comprises from 1% to 15% of amorphous monosaccharides based upon the weight of the granola cereal said amorphous monosaccharides being effective to achieve a semi-glossy, noncrystallizing coating.

8. The product of claim 1 wherein the granola cereal contains no added fat.

9. The product of claim 2 wherein the cereal flakes are ground to a particle size such that from about 50% to about 90% pass through a ¼ inch screen and rest on a #12 sieve screen and about 10% to about 50% pass through a #12 sieve screen and rest on the pan, the cereal base comprises from 35% to 45% cereal flakes, from 5% to 15% rolled grains, 5% to 15% cereal flour and from 5% to 15% crisp rice, and the sugar coating comprises from 1% to 15% of amorphous monosaccharides based upon the weight of the granola cereal, said amorphous monosaccharides being effective to achieve a semi-glossy noncrystalline coating.

* * * * *